(12) United States Patent
Bianchi et al.

(10) Patent No.: US 8,666,242 B2
(45) Date of Patent: Mar. 4, 2014

(54) RESPONSE TO OTUK-BDI FOR OTN INTERFACES TO RESTORE BIDIRECTIONAL COMMUNICATIONS

(75) Inventors: David Bianchi, Cambiago (IT); Anand Girish Parthasarathy, San Jose, CA (US); Ya Xu, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1419 days.

(21) Appl. No.: 11/758,197

(22) Filed: Jun. 5, 2007

(65) Prior Publication Data

US 2008/0304822 A1    Dec. 11, 2008

(51) Int. Cl.
*H04J 14/00* (2006.01)
*H04B 10/00* (2013.01)

(52) U.S. Cl.
USPC ................... 398/5; 398/1; 398/2; 398/17

(58) Field of Classification Search
USPC ..................... 398/1–9, 17, 19, 20
See application file for complete search history.

(56) References Cited

U.S. PATENT DOCUMENTS

| | | | |
|---|---|---|---|
| 7,298,700 B1 * | 11/2007 | Doverspike et al. | 370/235 |
| 2002/0191242 A1 * | 12/2002 | Sommer et al. | 359/110 |
| 2003/0097472 A1 * | 5/2003 | Brissette | 709/245 |
| 2004/0076151 A1 * | 4/2004 | Fant et al. | 370/389 |
| 2004/0205238 A1 * | 10/2004 | Doshi et al. | 709/241 |
| 2008/0232244 A1 * | 9/2008 | Gerstel et al. | 370/218 |

FOREIGN PATENT DOCUMENTS

| | | |
|---|---|---|
| EP | 1271822 A | 1/2003 |
| EP | 1531566 A | 5/2005 |
| EP | 1737145 A | 12/2006 |

OTHER PUBLICATIONS

"Interfaces for the Optical Transport Network (OTN)", Mar. 2003, International Telecommunication Union, G.709/Y.1331, pp. 10 and 54.*

"Optical Transport Network (OTN): Linear Protection", Mar. 2006, International Telecommunication Union, G.873.1, p. 5.*

* cited by examiner

*Primary Examiner* — Daniel Dobson

(57) ABSTRACT

In an OTN (Optical Transport Network), an OTN interface of a network element may receive a BDI (Backwards Defect Indicator) signal from a far end network element to which OTN frames are being transmitted. A BDI signal indicates the occurrence of a unidirectional failure in the transmission of OTN frames to which the far end network element responds by switching its routing to the network element. The OTN interface generates an AIS (Alarm Indication Signal) for its network element so that the network element switches network communication channels to the far end network element to ensure bidirectional switching upon a unidirectional failure.

13 Claims, 6 Drawing Sheets

RESPONSE TO OTUK-BDI FOR OTN INTERFACES TO RESTORE BIDIRECTIONAL COMMUNICATIONS

BACKGROUND OF THE INVENTION

The present disclosure is generally related to techniques of ensuring bidirectional notification of a unidirectional failure in an optical network and, more specifically, to ensuring protection switching in both directions upon a unidirectional failure in an Optical Transport Network (OTN).

Previously, optical networks had been confined mostly to the so-called long-haul telephone networks which were based upon SONET/SDH technology. The rise of the Internet increased the demand upon these optical networks which were based on less demanding telephonic requirements. To accommodate the transported data, mostly in the form of IP (Internet Packet) packets, protocols were developed for the IP packets to be transported by the SONET/SDH networks, sometimes characterized as POS (Packets over SONET). The adoption of WDM (Wavelength Division Multiplexing) and later DWDM (Dense WDM) technologies increased the capacity of the fibers of the optical network and alleviated some of the pressure of these optical networks. However, the continued increase in the amount of data in IP packets mostly and emerging applications of the Internet, such as voice over IP (VoIP), streaming music, podcasts, IP-based television (IPTV), and high-definition video-on-demand (VoD), has made the POS (Packet over SONET) solution insufficient. Furthermore, the requirements of the new applications often do not easily match the requirements of SONET/SDH technology.

An ongoing effort to move optical networks away from the old telephone-based SONET/SDH technology has been the OTN (Optical Transport Network) which more fully integrates DWDM and IP technologies. The OTN interfaces which are defined by the G.709 standard promulgated by the ITU-T, the Telecommunications Standardization Sector of the International Telecommunications Union, add a "digital wrapper" of OAM&P (Operations, Administration, Management and Provisioning) information to the IP traffic transported over a DWDM network. This additional layer of information enables service providers with the OAM&P capabilities which had been provided by the SONET/SDH transport network. OTN allows IP traffic, such as Ethernet based data, to be transported directly over an OTN without the intercession of SONET/SDH.

DETAILED DESCRIPTION OF THE INVENTION

One aspect provides for a method of operating an OTN interface for a first network element in an optical network. The method comprises the steps of: sending a plurality of OTN frames to a remote network element; receiving a BDI signal from the remote network element in response to a transmission failure of said plurality of the OTN frames to the remote network element; and generating an alarm indication signal for the first network element so that the first network element switches routing to the remote network element in response.

Another aspect provides for an OTN interface apparatus for a network element in an optical network. The OTN interface apparatus comprises at least one integrated circuit having circuits adapted to generate an alarm indication signal for the first network element upon receiving a BDI signal from a remote network element so that the first network element switches routing to the remote network element in response.

Another aspect provides for a method of operating an OTN. The method comprises: sending a plurality of OTN frames from a first network element to a second network element; detecting a failure in the sending step; switching routing from second network element to the first network element in response to the failure detecting step and sending a BDI signal from the second network element to the first network element; and generating an alarm indication signal for the first network element so that the first network element switches routing from the first network element to the second network element in response; whereby the routing switching is performed bidirectionally.

Still another aspect provides for an OTN interface apparatus for a first network element in an optical network. The OTN interface apparatus comprises: means for sending a plurality of OTN frames to a remote network element; means for receiving a BDI signal from the remote network element in response to a transmission failure of the plurality of OTN frames to the remote network element; and means for generating an alarm indication signal for the first network element so that the first network element switches routing to the remote network element in response.

Figure 1:
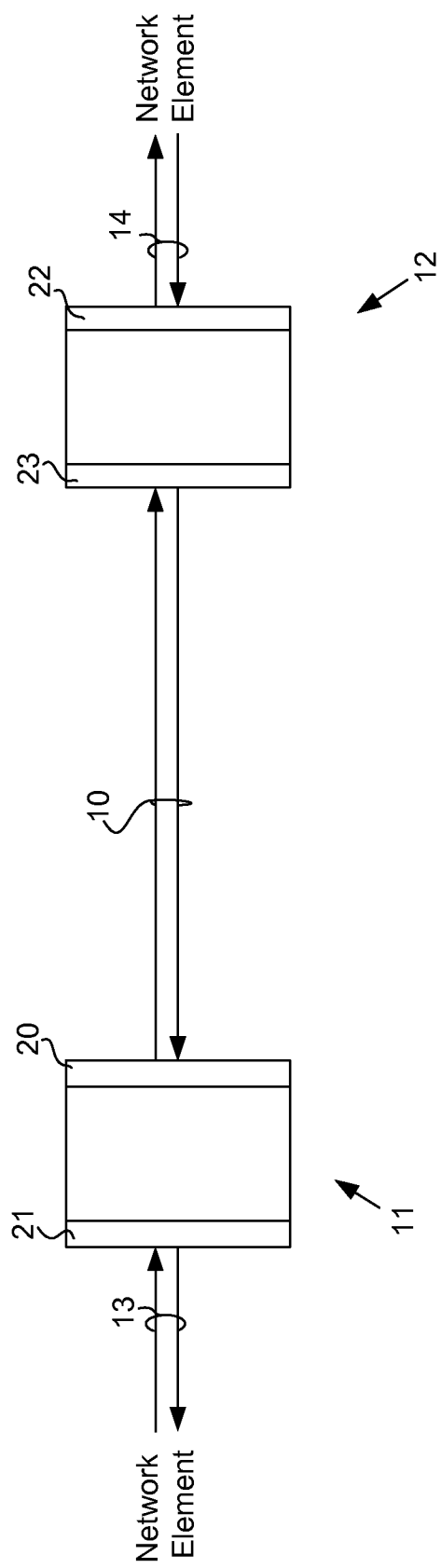
FIG. 1 illustrates a part of a representative optical networking operating under OTN.

FIG. 1 illustrates an example pair of network elements 11 and 12, such as client access points or 3R (Regeneration, Reshape and Re-time) points, of a representative OTN. The network elements 11 and 12 are connected by bidirectional communication channels 10 and are shown as being connected to another network element by bidirectional communication channels 13 and 14 respectively. The channels 10, 13 and 14 are carried by one or more optical fibers. Though the FIG. 1 network might be considered part of a ring network, the relatively simple arrangement is selected for the purposes of ease of illustration and the network of FIG. 1 should not be considered so limited. More networks, such as mesh networks, can likewise be contemplated.

Figure 2:
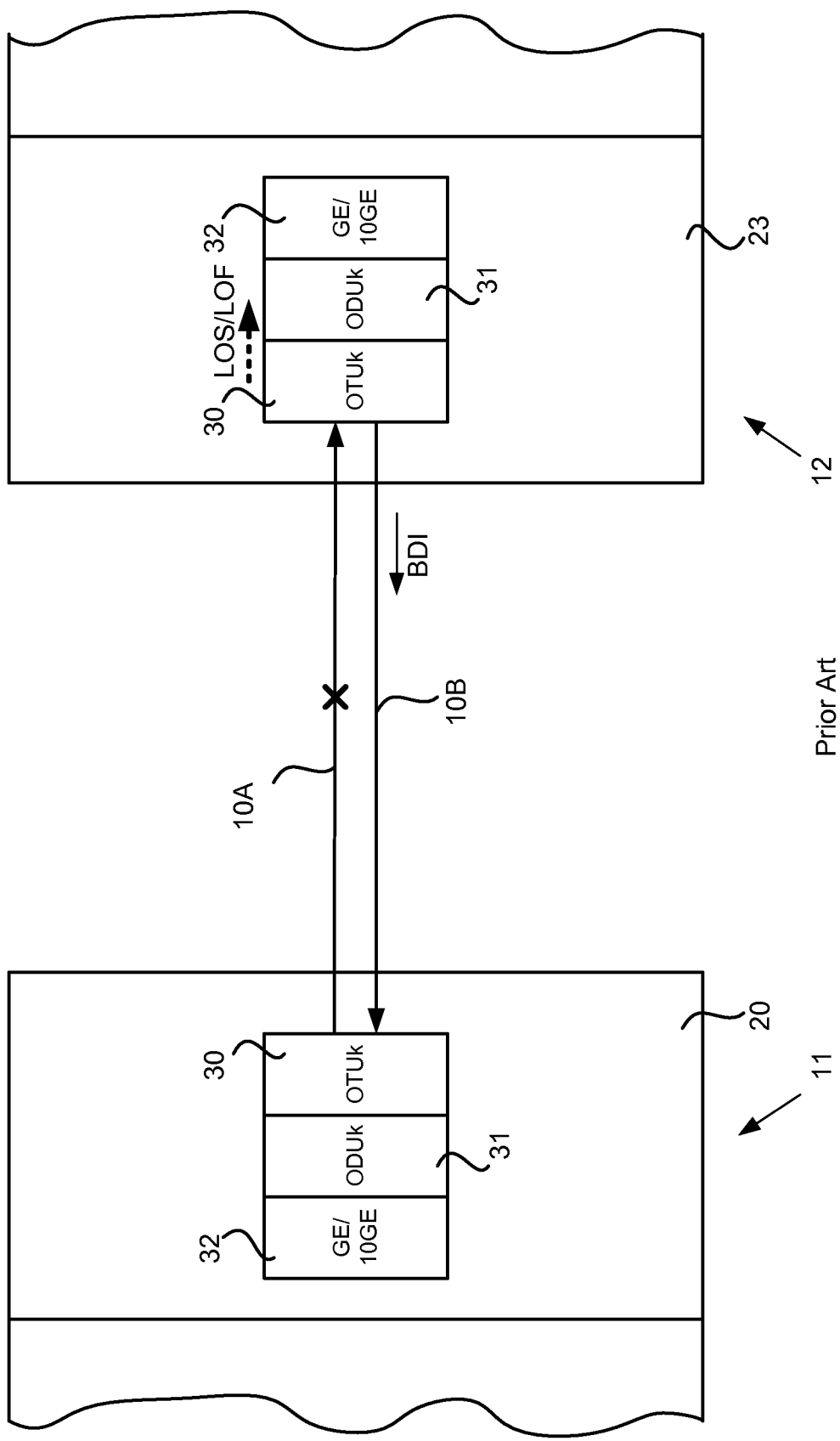
FIG. 2 shows a detail of the FIG. 1 network in which a failure in one of the unidirectional communication channels has occurred.

The network element 11 has a port 20 which is connected to the bidirectional communication channels 10 and a port 21 to the bidirectional communication channels 13. The network element 12 port 23 which is connected to the bidirectional communication channels 10 and a port 22 which is connected to the bidirectional communication channels 14. As shown by FIG. 2, the two network elements 11 and 12 with respective OTN interfaces 20 and 23 of FIG. 1, parts of an OTN, communicate over a communications channel 10A from the node 11 to the network element 12 and over a communications channel 10B from the network element 12 to the network element 11. Together both channels 10A and 10B form the bidirectional communication channels 10.

FIG. 2 represents the encapsulation of client data 32 in an ODU (Optical Data Unit) layer 31 and then in an OTU (Optical Transport Unit) layer 30 for transport in an OTN frame from network element 11 to network element 12. The k represents the particular standard interface and line rates of the OTN transport frames as defined by G.709 standards. So far k=1 with line rate at 2.666 Gbps, k=2 with line rate at 10.709 Gbps and k=3 at line rate 43.018 Gbps have been defined. Upon reaching the network element 12, the client data 32 are decapsulated from the OTU and ODU layers 30 and 31. The client data 32 are transported directly and in this example are Gigabit Ethernet or 10 Gigabit Ethernet data which, it should be noted, has increasingly become the protocol of choice of IP traffic. The client data 32 is native, to be distinguished from Ethernet data first encapsulated into SONET/SDH frames according to the older POS procedure.

When a failure on one of the communications channels occurs, as represented in this example by the "X" on the unidirectional communications channel 10A, the network element 12 which is receiving the transported data determines the failure occurrence and issues an AIS (Alarm Indication Signal), such as an LOS (Loss of Signal) and LOF (Loss of Frame). From these signals the interface 22 shuts down and switches to another communications channel for protection. Also, the network element 12 through the port 23 injects an OTUk-BDI (Backward Defect Indication) signal back toward the network element 11. The BDI signal, which is an OTN maintenance signal, is asserted in the OTU frames being sent back from the network element 12 to the network element 11.

The port 20 and the network element 11 detect the BDI signal and notifies the network management. No protection switching to route around the failure is performed. The detection of a maintenance OTN signal, the OTUk-BDI, does not generate any action in the network element 11 and the port 20. The OTN standards, specifically ITU-T G. 798, do not require any action for the OTUk-BDI signal toward the client interface. The net result is that the protection switching is unidirectional, i.e., the communications channel 10B is rerouted, but not the communications channel 10A.

Figure 3:
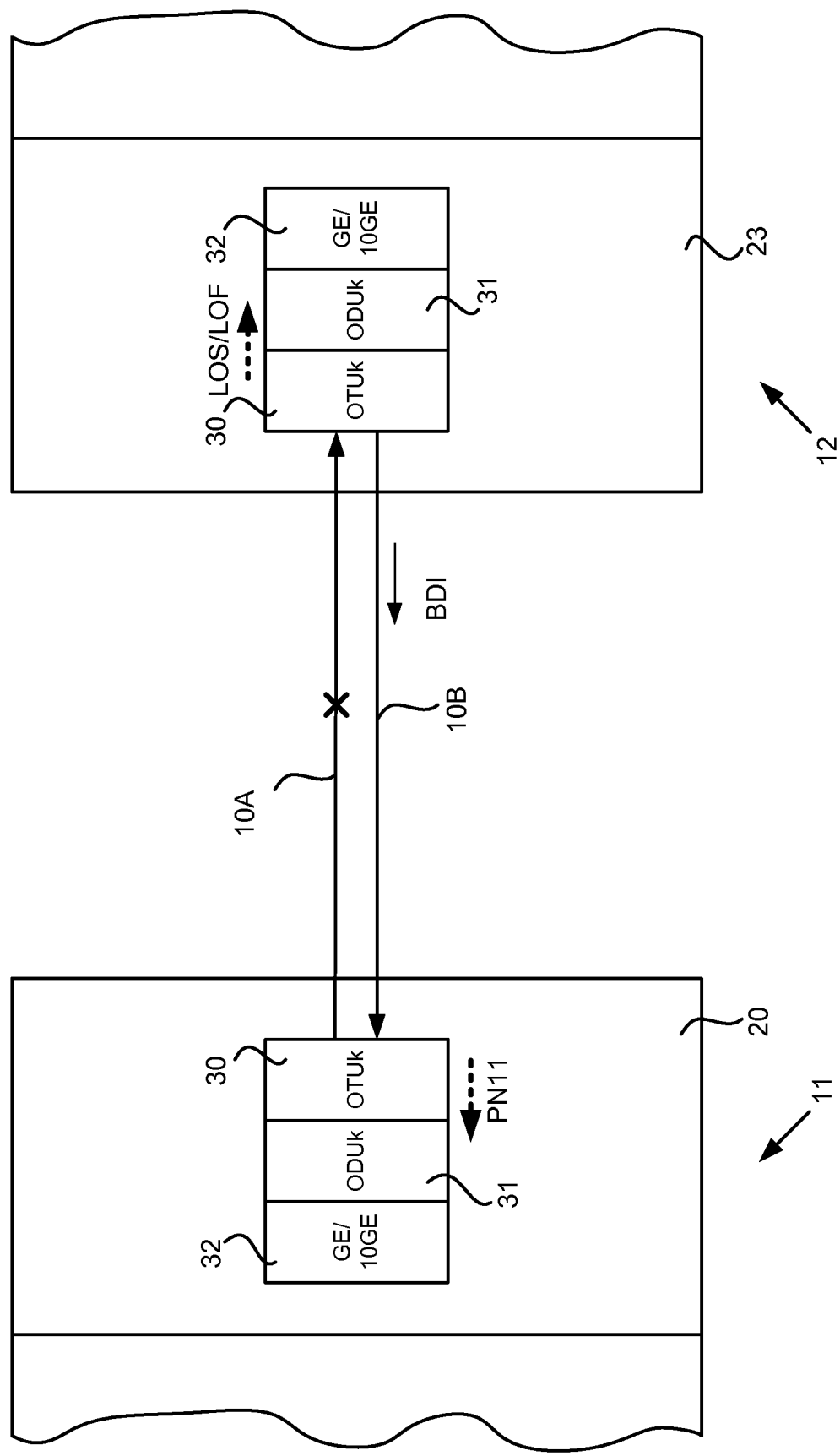
FIG. 3 shows a detail of the FIG. 1 network in which a unidirectional failure generates bidirectional route protection switching according to one embodiment.

FIG. 3 illustrates an embodiment. Upon receiving the BDI signal, the port for the sending network element, i.e., the port 20 and network element 11 in this example, generates an AIS (Alarm Indicator Signal) for the network element 11. The AIS is preferably a PN-11 signal, a 2047-bit polynomial sequence which covers an entire OTU frame including the framing bytes (FAS (Frame Alignment Signals)). The AIS causes the network element 11 to switch routing to the network element 12 so that routing of the communications channel 10A is switched. Thus switching is performed bidirectionally after a unidirectional failure between the network element 11 and 12.

For example, where the network element represents an IP router with an OTN interface, carrying direct Ethernet traffic, i.e., not mapped as POS, the generation of the PN-11 signal triggers the switching operations of the MPLS (MultiProtocol Label Switching) software which is commonly used in many optical network systems. An improved or newer version of MPLS is GMPLS (Generalized MPLS) which is expected to be widely used future optical networks. MPLS operates at an OSI (Open Systems Interconnection) Reference Model layer that is generally considered to lie between traditional definitions of Layer 2 (the data link layer) and Layer 3 (the network layer) and provides a unified data-carrying service for both circuit-based clients and packet-switching clients. MPLS is used to carry many different kinds of traffic, including IP packets, as well as native ATM (Asynchronous Transfer Mode), SONET, and Ethernet frames.

Figure 4:
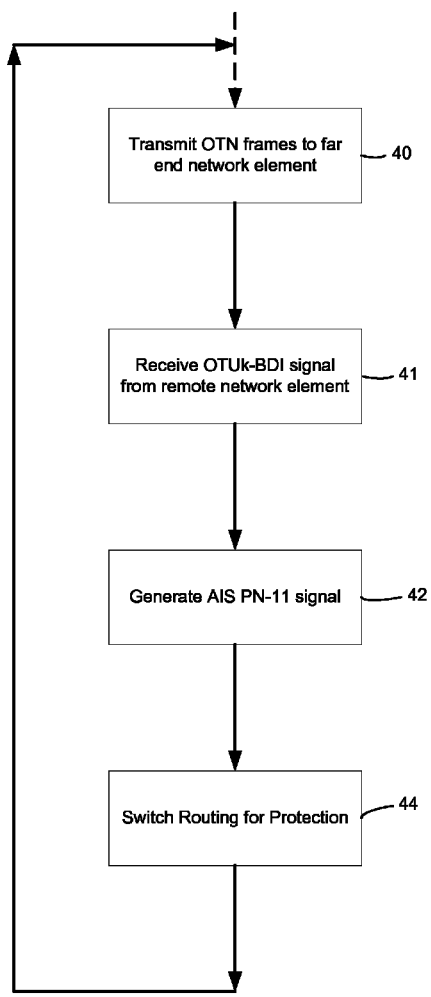
FIG. 4 is a flow chart of operations of an OTN interface according to an embodiment.

FIG. 4 illustrates the operations by a flow chart of operations of the OTN frame transmitting network element 11 and its OTN interface 20. The dotted line to step 40 indicates that the step 40 is part of continuing operations, including initialization steps, which are not shown. In step 40 the network element transmits OTN frames to the far end network element 12 and its interface 23. Upon a failure in the transmission of the OTN frames to the far end network element 12, the network element 12 generates a BDI signal in the OTN frames being sent to the first network element 11 which receives the signal in step 41. In response to the BDI signal, the interface 20 generates an AIS, specifically the PN-11 signal for the network element 11 in step 42. In step 44 the network element 11 switches routing to the far end network element 12 and a feedback loop ensures that the OTN frames continue to be sent to the network element 12.

Figure 5A:
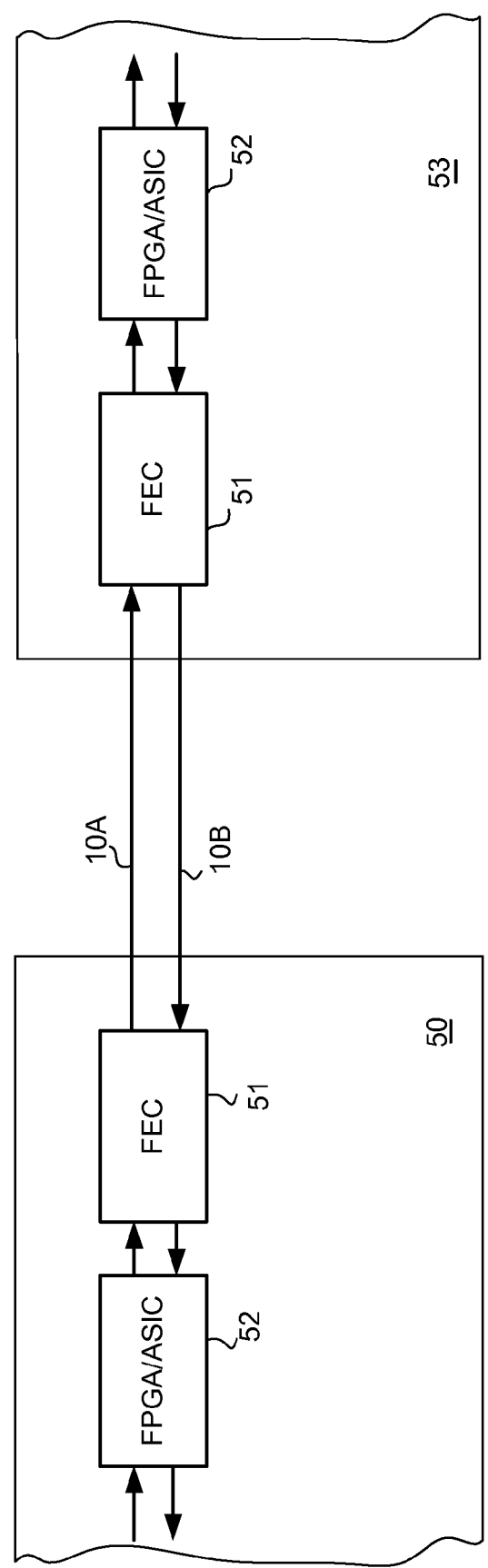
FIG. 5A is one implementation of a port line card according to an embodiment and FIG. 5B is another implementation of a port line card according to another embodiment.

The network element ports, such as ports 20 and 23, are preferably implemented as line cards, cards for network interfaces. FIG. 5A illustrates how an example network interface card might be arranged according to one embodiment. In this example, two network interface cards 50 and 53 for the ports 20 and 23 respectively, each have one Forward Error Correction (FEC) integrated circuit 51 and one Field Programmable Gate Array (FPGA) integrated circuit 52. Alternatively, the integrated circuit 52 can be an Application Specific Integrated Circuit (ASIC). Data is transmitted bidirectionally over the communication channels 10A and 10B (see FIG. 3).

The FEC integrated circuits 51 encode OTN frames by a Reed-Solomon code for transmission and decode them after reception. The encoding of the OTN frames helps ensure the integrity of the transmitted data and allows the data to be transmitted successfully at high rates. The FPGA/ASIC integrated circuit 52 handles other operations of the port. With respect to an embodiment, the FPGA/ASIC 52 generates the AIS, the PN-11 signal, upon reception of the OTUk-BDI signal from the network element to which OTN frames had previously been transmitted. The PN-11 signal then engages the switching mechanisms in the network element so that protection switching is bidirectional.

Figure 5B:
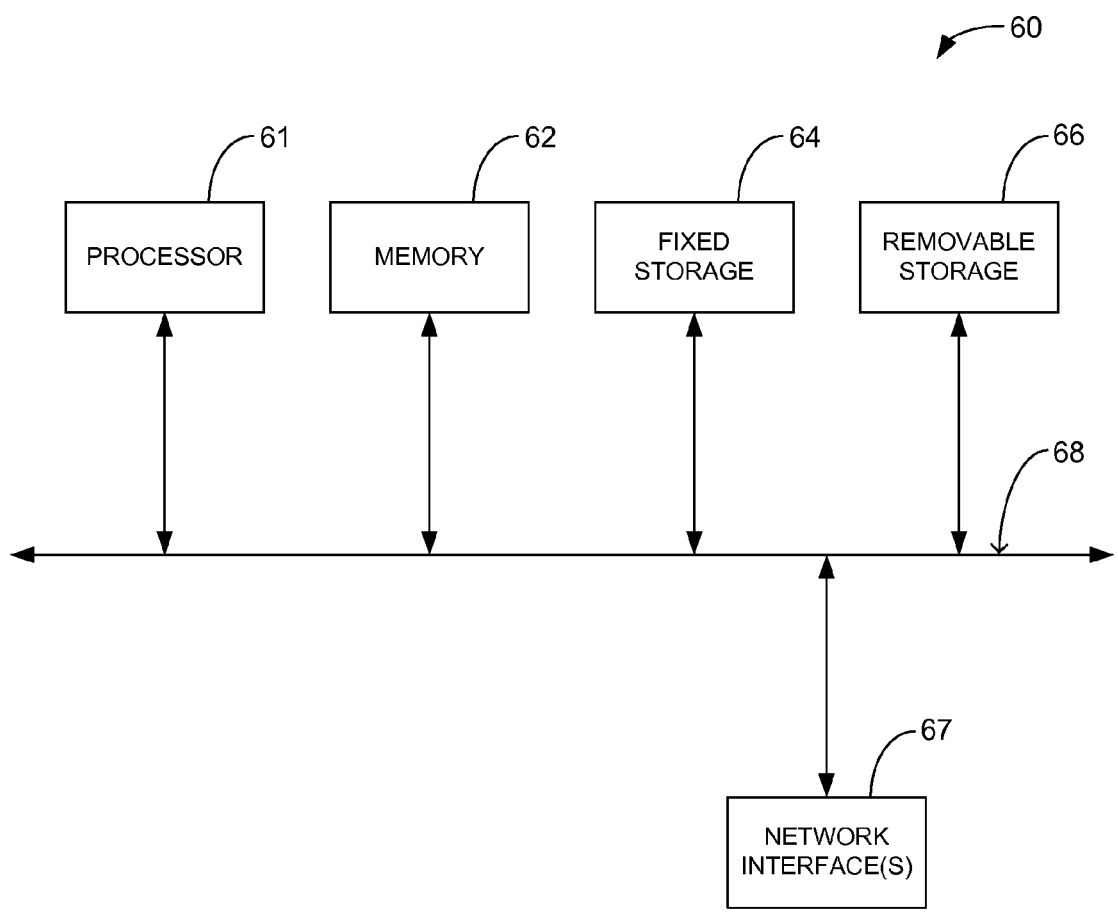

FIG. 5B illustrates an alternative arrangement for the network interface cards. Rather than a dedicated FPGA or ASIC integrated circuits 52, the network interface cards use a generalized arrangement. According to this embodiment, operations and functions of the FPGA/ASIC integrated circuit 52 are carried out by a computer system 60 which includes a memory subsystem 62 which can store and retrieve software programs incorporating computer code, data, and the like, and a central processor subsystem 61 which, among other functions, processes the instructions and data of the computer code. Example computer readable storage media for the memory 62 include semiconductor system memory preferably, CD-ROM, floppy disk, tape, flash memory, and hard drive. The computer system 60 further includes subsystems, such as fixed storage 64 (e.g., hard drive), removable storage 66 (e.g., CD-ROM drive), and one or more network interfaces 67, all connected by a system bus 68. The network interface 67 for example might provide the pathway to and from the FEC integrated circuit 51, and to and from the rest of the network interface card (not shown). Additional or fewer subsystems may be used. For example, the computer system arrangement 60 may include more than one processor in the subsystem 61 (i.e., a multi-processor system), or a cache memory.

Thus the computer system 60 arrangement can be used to generate the AIS in response to a received OTUk-BDI signal. The computer system 60 could also integrate the functions of the FEC integrated circuit 51, but for most situations the higher speeds of the FEC integrated circuit 51 dedicated to the complex operations of encoding and decoding the Reed Solomon algorithm of OTN FEC is more suitable.

Hence the techniques described herein provides for bidirectional switching for routing protection even with a unidirectional failure in an OTN. The advantages of the OTN, such as the application of Operations, Administration, Management and Provisioning (OAM&P) information to IP traffic transported over a DWDM network, can be realized. For example, the OTN can transport IP traffic, such as Ethernet-based data directly over the OTN without the intercession of SONET/SDH.

The above description is intended by way of example only.

What is claimed is:

1. A method comprising:
    sending a plurality of optical transport network (OTN) frames from an OTN interface of a first network element to a remote network element over a first unidirectional channel of a bi-directional communication channel;
    receiving over a second unidirectional channel of said bidirectional communication channel an Optical Transport Unit (OTU) backwards defect indicator (BDI) signal at said OTN interface from said remote network element that is configured to indicate a transmission failure of said first unidirectional channel; and
    in response to receiving said OTU BDI signal, generating an alarm signal comprising a polynomial sequence that is configured to trigger switching operations at a Multi-Protocol Label Switching (MPLS) layer so that said first network element switches routing to said remote network element.

2. The method of claim 1, wherein generating said alarm signal comprises generating a PN-11 signal.

3. The method of claim 1, wherein sending comprises sending said plurality of OTN frames encapsulating native Ethernet client data.

4. An apparatus comprising:
    a receiver configured to be coupled to a bidirectional communication channel;
    a circuit configured to generate an alarm signal comprising a polynomial sequence upon receiving an Optical Transport Unit (OTU) backwards defect indicator (BDI) signal from a remote network element over a first bidirectional communication channel of said bidirectional communication channel, wherein said BDI is configured to indicate a unidirectional transmission failure of a second unidirectional channel of said bidirectional communication channel, wherein said alarm signal is configured to trigger switching operations of an Multi-Protocol Label Switching (MPLS) software function; and
    a processor configured to switch routing to said remote network element using said MPLS software function in response to said alarm signal.

5. The apparatus of claim 4, wherein said circuit is configured to generate said alarm indication signal comprising a PN-11 signal.

6. The apparatus of claim 4, wherein said circuit is further configured to generate said alarm signal upon receiving said OTU BDI signal in response to a transmission of a plurality of OTN frames to said remote network element when said plurality of OTN frames are not received by said remote network element indicating said failure of said second unidirectional channel.

7. The apparatus of claim 6, wherein said plurality of OTN frames comprise native Ethernet client data.

8. A method comprising:
    sending a plurality of optical transport network (OTN) frames from a first network element to a second network element over a unidirectional channel of a bidirectional communication channel;
    detecting a failure in said unidirectional channel;
    first switching routing from said second network element to said first network element in response to detecting said failure;
    sending an Optical Transport Unit (OTU) backwards defect indicator (BDI) signal from said second network element to said first network element; and
    in response to receiving said OTU BDI signal, generating an alarm signal comprising a polynomial sequence that is configured to trigger second switching routing from said first network element to said second network element at a Multi-Protocol Label Switching (MPLS) layer;
    wherein said first and second switching routing provides bidirectional channel protection for said bidirectional communication channel when said failure occurs in said unidirectional channel.

9. The method of claim 8, wherein generating said alarm signal comprises generating a PN-11 signal.

10. The method of claim 8, wherein sending comprises sending said plurality of OTN frames encapsulating native Ethernet client data.

11. An apparatus comprising:
    means for sending a plurality of optical transport network (OTN) frames from a local network element to a remote network element over a first unidirectional channel of a bi-directional communication channel;
    means for receiving an Optical Transport Unit (OTU) backwards defect indicator (BDI) signal that is configured to indicate a failure of said first unidirectional channel from said remote network element when said remote network element detects a transmission failure of said plurality of said OTN frames to said remote network element; and
    means for generating an alarm signal comprising a polynomial sequence that is configured to trigger switching operations at a Multi-Protocol Label Switching (MPLS) layer so that said local network element switches routing of a second unidirectional channel of a bi-directional communication channel to said remote network element.

12. The apparatus of claim 11, wherein said means for generating said alarm indication signal comprises means for generating a PN-11 signal.

13. The apparatus of claim 11, wherein said means for sending said plurality of OTN frames means for encapsulating native Ethernet client data in said plurality of said OTN frames.

* * * * *